Patented June 6, 1939

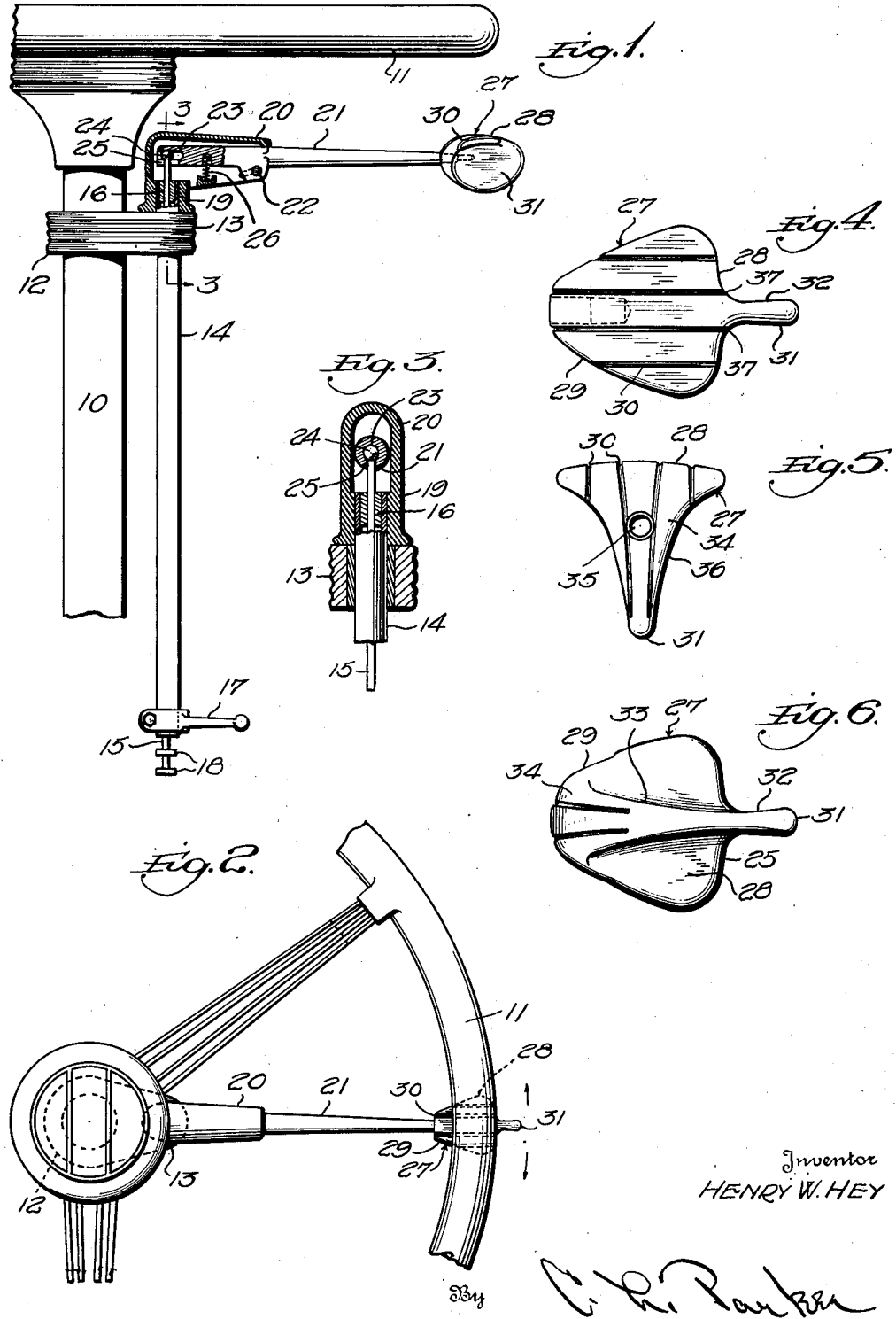

2,161,778

UNITED STATES PATENT OFFICE 2,161,778

CONTROL HANDLE DEVICE

Henry W. Hey, Richmond, Va., assignor to Automatic Shifters, Inc., Richmond, Va., a corporation of Virginia Application March 15, 1938, Serial No. 196,084

16 Claims. (Cl. 74—484)

This invention relates to control handle devices, and more particularly to a handle device for controlling the functions of a gear shifting mechanism for motor vehicles.

Several different types of gear shifting mechanisms have been developed for motor vehicles wherein a power source is employed for effecting the shifting actions, and such power source is controlled by a suitable manually operable handle. In most instances, such handles have been mounted to partake of movements corresponding to the movements of a conventional gear shift lever for causing the gear shifting mechanism to perform corresponding functions, and the control handles have been mounted in different more or less convenient positions. For example, one type of such mechanism provides a handle arranged normally substantially parallel to the vehicle steering column and supported by an arm carried thereby whereby the operator may reach the handle without moving his hand a substantial distance from the steering wheel. In other installations, the control handles have been supported with respect to the dash of the vehicle and project upwardly and rearwardly to be readily reached by the operator.

Both types of handle structures referred to are advantageous in that they permit elimination of the conventional gear shift lever from the floor boards of the vehicle and thus facilitate the seating of three passengers in the front seat. Each type of handle, however, requires that the operator remove his hand from the steering wheel to shift gears and that he grasp the manual lever or handle in performing the different shifting operations.

An important object of the present invention is to provide a novel handle structure capable of use for performing different controlling functions of a motor vehicle and which is particularly adapted for use with gear shifting mechanisms and permits the performance of the different shifting operations without the necessity for the operator removing his right hand from the steering wheel.

A further object is to provide a novel combination of the control handle with the steering wheel wherein the structure of the handle and associated elements and their relation to the steering wheel are such as to greatly facilitate movements of the control handle by the operator.

A further object is to provide a novel and simplified arrangement of the control handle with respect to the steering wheel wherein the operator, after easily moving the handle in neutral to a position ready to start a shift into low gear can completely shift successively into first, second and high gears by using a single finger of the right hand.

A further object is to provide such a combination wherein the handle is provided with a finger engaging portion arranged to facilitate movement of the handle in neutral to select the first and reverse gear shift rail of the transmission for operation, and to provide a second finger engaging portion, engageable wholly independently of the first portion, whereby the operator may shift successively into first, second and high gears by the simple use of one finger.

A further object is to provide a handle of the character referred to wherein the first finger engaging portion terminates substantially beneath the radially outer limit of the steering wheel to permit one or two fingers to be hooked therebeneath without the operator removing his hand from the steering wheel, and wherein the second finger engaging portion projects radially outwardly with respect to the steering wheel to be readily engaged by the operator's finger.

A further object is to provide a handle per se having two finger engaging portions angularly arranged with respect to each other and one projecting beyond the other to facilitate engagement of the finger with the handle and the subsequent movement of the handle.

Other objects and advantages of the invention will become apparent during the course of the following description.

In the drawing I have shown one embodiment of the invention. In this showing:

Figure 1 is a fragmentary elevation of a vehicle steering wheel and column assembly showing the invention applied, portions of the latter being shown in section, Figure 2 is a plan view of the same, Figure 3 is a detail sectional view on line 3—3 of Figure 1, Figure 4 is an enlarged plan view of the handle element per se, Figure 5 is an elevation of the radially inner end of the handle per se, and Figure 6 is a bottom plan view of the same.

Referring to Figure 1, the numeral 10 designates a conventional motor vehicle steering column having the usual steering wheel 11 mounted at its upper end. A bearing bracket 12 is fixed to the steering column adjacent its upper end and is provided with a laterally extending portion 13 forming a bearing for a tubular member 14. The lower portion of the steering column is preferably provided with a similar bearing bracket (not shown) for the same purpose.

A stem 15 is mounted in the tubular member 14 for axial movement with respect thereto in suitable bearings 16 and the members 14 and 15 are connected to control the functions of any suitable parts of the apparatus. For example, the tube 14 may be provided at its lower end with an arm 17 adapted to swing upon rocking movement of the tube 14 to control the operation of a gear shifting motor, while the stem 15 may be provided adjacent its lower end with spaced disks 18 adapted to receive a suitable device therebetween for controlling a mechanism through which selection of the transmission shift rails for operation may be determined. The apparatus is particularly designed for controlling power operated gear shifting mechanisms which form no part of the present invention and may be of any desired type.

A sleeve 19 is secured to the tubular member above the bearing 13 and contacts with the upper face thereof. The sleeve 19 is provided with a preferably integral housing member 20 which is preferably of inverted U shape in cross-section. This housing receives the inner end of a handle lever 21 as shown in Figures 1 and 3. The lever 21 is pivotally connected as at 22 to the housing 20 adjacent the outer end thereof and accordingly it will be apparent that the outer end of the lever 21 swings about the pivot 22 toward and away from the steering wheel 11. Referring to Figure 3 it will be apparent that the inner end of the lever 21 is approximately equal in width to the interior of the housing 20 and accordingly movement of the lever 21 parallel to the plane of the steering wheel 11 will rotate the tubular member 14 on its axis.

The inner end of the lever 21 is provided with a substantially cylindrical opening 23 which receives a ball 24 formed on the upper end of the stem 15. Beneath the cylindrical opening 23, the inner end of the lever is provided with a slot 25 through which the stem 15 projects. It will be apparent that movement of the lever 21 about its pivot axis 22 will transmit axial movement to the stem 15, the opening 23 compensating for relative movement between the stem 15 and the inner end of the lever 21. A spring 26 biases the inner end of the lever 21 upwardly and accordingly biases the outer end of the lever downwardly away from the steering wheel 11.

A preferably integral handle member indicated as a whole by the numeral 27 is connected to the outer end of the lever 21. This handle is preferably made of a molding composition of which there are several suitable types available on the market. The handle comprises an upper flange portion 28 arranged approximately parallel to the plane of the steering wheel and such flange preferably decreases in width radially inwardly as indicated at 29. For the purpose of improving the ornamental appearance of the handle the upper surface of the flange portion 28 may be suitably grooved as at 30, although it will be apparent that any desired ornamentation may be employed and that such ornamentation does not enter into the functioning of the device.

The flange portion 28 forms a finger engaging member, as will become apparent and a second finger engaging portion 31 is arranged preferably perpendicular to the flange 28 as shown. The flange or finger piece 31 projects a substantial distance below the flange 28, as shown in Figures 1 and 5, and it projects radially outwardly beyond the limits of the flange 28, as shown in Figures 1, 4 and 6. The radially outer portion of the flange 31 is relatively thin as at 32 and toward the inner extremity of the handle the flange 31 gradually thickens as at 33 to form a reasonably thick base 34 provided with a preferably tapped opening 35 to receive the threaded outer end of the lever 21.

It will be apparent that the base portion 34 has its sides gracefully curved downwardly and inwardly as at 36 toward the lower extremity of the flange 31. It also will be apparent that the radially outer edge portions of the flange 28 curve as at 37 to merge into the opposite face portions of the flange 31.

Referring to Figures 1 and 2, it will be noted that the radially outer extremity of the finger piece 28 terminates approximately beneath the outer extremity of the steering wheel 11. Accordingly it will be apparent that when the lever 21 is moved parallel to the plane of the steering wheel to rock the tube 14, the outer extremity of the finger piece 28 describes an arc of a circle which is almost concentric to and equal in diameter to the outer extremity of the steering wheel 11. In this connection it will be noted that the axes of the tube 14 and steering column 11 are arranged fairly close to each other and accordingly the outer extremity of the finger piece 28 will move only a slight distance radially with respect to the steering wheel 11 when turned on the axis of the tube 14 within its limited arc of turning movement. It also will be apparent from Figures 1 and 2 that the finger piece 31 is arranged approximately perpendicular to the plane of the steering wheel and to the finger piece 28, and that it projects radially outwardly beyond the limits of the steering wheel.

The operation of the device is as follows:

As previously stated, the device is primarily intended for use in controlling the functions of a gear shifting mechanism for motor vehicles. When so used, the disks 18 of the stem 15 will be connected to a suitable device arranged to control the selection of the shift rails of the vehicle to determine which rail will be rendered operative. The arm 17 is intended to be connected to suitable control means for the motor which is employed for shifting the selected rail. Accordingly it will be apparent that the handle may be moved toward and away from the steering wheel 11 to select a shift rail for operation and that it then may be moved to turn the tubular member 14 on its axis to effect operation of the selected shift rail.

In practice, it is preferred that the handle is moved toward the steering wheel to select the first and reverse gear shift rail for operation. Consequently movement of the handle away from the steering wheel will select the second and high gear shift rail for operation and the spring 26 is preferably employed for biasing the handle to its lower position to select the second and high gear shift rail.

The structure of the handle and associated parts and their arrangement with respect to the steering wheel greatly facilitate the controlling of the selecting and gear shifting functions of a gear shifting mechanism with which the device is associated. As previously stated, the handle 27 is moved toward the steering wheel to select the first and reverse gear shift rail and away from the steering wheel at right angles thereto to select the second and high gear shift rail. When the handle is arranged in the first of such positions it may be moved downwardly and rearwardly parallel to the plane of the steering wheel to effect the shift into low gear, and forwardly and upwardly parallel to the plane of the steering wheel to effect the shift into reverse gear. Similarly, when the handle is arranged in the proper position to select the second and high gear shift rail, it may be moved upwardly and forwardly parallel to the plane of the steering wheel to effect the shift into second gear, or it may be moved downwardly and rearwardly parallel to the plane of the steering wheel to effect the shift into high gear.

These various shifting movements are greatly simplified and facilitated with the present device. Assuming that the handle is in neutral position, which is the only position in which it may be moved toward and away from the steering wheel when used as a gear shifting handle, the operator, while leaving the thumb and the adjacent portion of the right hand on the steering wheel may hook the index or middle finger beneath the flange 28 to lift it upwardly toward the steering wheel, thus moving the inner end of the lever 21 downwardly to effect the proper axial movement of the stem 15 to select the first and reverse gear shift rail for operation. This movement of the handle may be very easily accomplished by the operator since with the hand held in the proper position the finger which is used to lift the flange 28 will have its end naturally curved therebeneath.

With the handle supported in such position, the operator may exert a slight force against the forward face of the flange 31 to initiate movement of the handle downwardly and rearwardly parallel to the plane of the steering wheel 11 toward the low gear position. In the types of gear shifting mechanism with which the present handle is adapted to be used there are provided means for causing the handle to follow an H-shaped path as is true in the conventional gear shift lever. Accordingly it will be apparent that as soon as the handle has been moved slightly away from the neutral position the operator need not support the handle by pulling upwardly on the flange 28 since the handle will be forced to remain in the same plane during movement into low gear position. Most of the movement into the low gear position, therefore, may be accomplished with the installation of a simple pressure against the forward face of the flange 31.

When the operator is ready to shift into second gear, he may engage one finger against the rear face of the flange 31, without removing his hand from the steering wheel, and by thus transmitting movement to the lever 21 through the flange 31 the lever will be moved to neutral position. When such position is reached, the biasing spring 26 will move the inner end of the lever 21 toward the steering wheel and the outer end of the lever away from the steering wheel, thus selecting the second and high gear shift rail for operation.

By continuing to exert force against the rear face of the flange 31 the lever 21 will move upwardly and forwardly parallel to the plane of the steering wheel 11, thus effecting the shift into second gear. It will be apparent that the shift from first gear to second gear will have been made with the use of only one of the operator's fingers, the biasing spring 26 automatically transferring the shift from the low and reverse gear shift rail to the second and high gear shift rail at the neutral position of the handle.

When the operator is ready to shift into high gear, this operation may be readily accomplished merely by engagement of one finger of the operator against the forward face of the flange 31, without removing the hand from the steering wheel, and thus the lever 21 may be moved straight through from the second to the high gear position, the second and high gear shift rail being the only rail moved during such operation and the handle remaining in the proper position to effect operation of such shift rail.

Accordingly it will be apparent that the operator will hook his finger beneath the flange 28 only for the purpose of moving the lever 21 toward the steering wheel to select the first and reverse gear shift rail and the operator need support the handle in such position only long enough to shift slightly away from the neutral position toward either first or reverse gear positions, after which it is merely necessary for the operator to exert pressure with one finger against the proper face of the flange 31. Accordingly it will be apparent that most of the shifting movements can be accomplished simply by exerting a force against one side of the flange 31. For example, after having selected the low and reverse gear shift rail and moved the handle slightly away from neutral position, the operator need use only one finger to complete the shift into low gear position, as well as the subsequent shifts into second and high gear.

The termination of the radially outer edge of the flange 28 beneath the radially outer extremity of the steering wheel greatly facilitates the natural curving of one or two fingers beneath the flange 28 to lift it toward the steering wheel to select the first and reverse shift rail. For all other movements, the operator may turn his hand slightly to move the end of his finger from beneath the flange 28 and engage it with the flange 31, and it will be apparent that the extension of the flange 31 radially outwardly beyond the steering wheel greatly facilitates the engagement of the operator's finger with such flange.

In a typical gear shifting mechanism with which the present device has been employed the maximum movement of the handle parallel to the plane of the steering wheel between first and reverse gears is 3¼", or 1⅝" on each side of neutral position. Therefore, while the axis of the tubular member 14 is slightly offset from the axis of the steering column, the radially outer extremity of the flange 28 when the handle is moved to rock the tubular member 14, does not move radially with respect to the steering wheel to an appreciable extent, and accordingly it may be considered that the radially outer extremity of the flange 28 remains approximately beneath the radially outer limit of the steering wheel in all of the shifting positions of the handle 27.

From the foregoing it will be apparent that the present device greatly simplifies the gear shifting operations of a shifting mechanism through the structure of the handle per se and through the handle and associated elements in their particular relationship to the steering wheel. It is never necessary for the operator to remove his hand from the steering wheel and each gear shifting operation may be readily performed with a single finger.

The handle structure is preferably made in the form shown in the drawing with the flange 28 relatively elongated substantially circumferentially of the steering wheel and approximately parallel to the plane thereof with the flange 31 of substantial depth and approximately perpendicular to the flange 38. However, it will be obvious that satisfactory results can be obtained by some modification of the particular proportions and arrangements of the parts, such, for example, as a change in the cross-sectional shape of either of the two flanges, or a change in the particular relationship of the flanges with respect to each other. Accordingly where the flange portions of the handle have been defined in such terms as "substantially perpendicular to each other", "perpendicular to the plane of the steering wheel", and the like, it is to be understood that such expressions are relative and are not to be interpreted as being limited to flange elements which are relatively flat in cross-section and arranged perpendicular to each other. It also is to be understood that the term "handle element" is not to be construed as being limited to a structure formed of a single piece.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In combination with a vehicle steering wheel, a control handle adjacent the steering wheel and in such position with respect thereto as to permit access of the hand of the operator to said handle without the operator having to remove his hand from the steering wheel, said handle being mounted to partake of movement in two directions with respect to the steering wheel and comprising portions engageable to effect the respective movements of the handle, one such portion projecting radially with respect to the steering wheel a greater distance than the other portion to facilitate its engagement independently of such other portion.

2. In combination with a vehicle steering wheel, a control handle adjacent the steering wheel and in such position with respect thereto as to permit access of the hand of the operator to said handle without the operator having to remove his hand from the steering wheel, said handle being mounted to partake of movement in two directions with respect to the steering wheel and comprising portions engageable to effect the respective movements of the handle, one such portion projecting radially with respect to the steering wheel a greater distance than the other portion to facilitate its engagement independently of such other portion, said portions of said handle being arranged respectively approximately parallel and perpendicular to the plane of the steering wheel.

3. In combination with a vehicle steering wheel, a control handle adjacent the steering wheel and in such position with respect thereto as to permit access of the hand of the operator to said handle without the operator having to remove his hand from the steering wheel, said handle being mounted to partake of movement in two directions with respect to the steering wheel and comprising portions engageable to effect the respective movements of the handle, one such portion projecting radially with respect to the steering wheel a greater distance than the other portion to facilitate its engagement independently of such other portion, said first named portion of said handle being arranged approximately perpendicular to the plane of the steering wheel and said second named portion of the handle being arranged approximately parallel to the plane of the steering wheel.

4. In combination with a vehicle steering wheel, a control handle beneath and adjacent the steering wheel and in such position with respect thereto as to permit access of the hand of the operator to said handle without the operator having to remove his hand from the steering wheel, said handle being mounted to partake of movement in two directions and comprising finger portions engageable to effect the respective movements of the handle, one such portion being arranged approximately parallel to the plane of the steering wheel and beneath the rim thereof, the other portion of said handle being arranged approximately perpendicular to said first named portion and projecting radially outwardly therebeyond.

5. In combination with a vehicle steering wheel, a control handle beneath and adjacent the steering wheel and in such position with respect thereto as to permit access of the hand of the operator to said handle without the operator having to remove his hand from the steering wheel, said handle being mounted to partake of movement in two directions and comprising finger portions engageable to effect the respective movements of the handle, one such portion being arranged approximately parallel to the plane of the steering wheel and beneath the rim thereof, the other portion of said handle being arranged beneath the first named portion thereof and approximately perpendicular thereto, and extending radially outwardly therebeyond.

6. In combination with a vehicle steering wheel, a control handle beneath and adjacent the steering wheel and in such position with respect thereto as to permit access of the hand of the operator to said handle without the operator having to remove his hand from the steering wheel, said handle being mounted to partake of movement in two directions and comprising finger portions engageable to effect the respective movements of the handle, one such portion being arranged approximately parallel to the plane of the steering wheel and beneath the rim thereof, the other portion of said handle lying beneath said first named portion approximately perpendicular thereto and substantially centrally of the width thereof, said portions being formed integral with each other and said second named portion extending radially outwardly beyond said first named portion.

7. In combination with a vehicle steering wheel, a lever mounted adjacent and approximately radially of the steering wheel and supported for movement whereby the end of the lever adjacent the rim of the steering wheel is movable toward and away from the steering wheel and is movable parallel to the plane thereof, and a handle element carried by said lever and arranged in such position with respect to the steering wheel as to permit access of the hand of the operator to said handle element without the operator having to remove his hand from the steering wheel, said handle element being provided with finger engaging portions approximately perpendicular to each other, one of such portions being arranged approximately parallel to the plane of the steering wheel adjacent the rim thereof.

8. In combination with a vehicle steering wheel, a lever mounted adjacent and approximately radially of the steering wheel and supported for movement whereby the end of the lever adjacent the rim of the steering wheel is movable toward and away from the steering wheel and is movable parallel to the plane thereof, and a handle element carried by said lever and arranged in such position with respect to the steering wheel as to permit access of the hand of the operator to said handle element without the operator having to remove his hand from the steering wheel, said handle element being provided with finger engaging portions approximately perpendicular to each other, one of such portions being arranged approximately parallel to the plane of the steering wheel adjacent the rim thereof, the other portion of said handle element extending radially outwardly with respect to the steering wheel beyond said first named portion.

9. In combination with a vehicle steering wheel, a lever mounted beneath and approximately radially of the steering wheel and supported for movement whereby the end of the lever adjacent the rim of the steering wheel is movable toward and away from the steering wheel and is movable parallel to the plane thereof, and a handle element carried by said lever and arranged in such position with respect to the steering wheel as to permit access of the hand of the operator to said handle element without the operator having to remove his hand from the steering wheel, said handle element being provided with finger engaging portions approximately perpendicular to each other, one of such portions being arranged approximately parallel to the plane of the steering wheel adjacent the rim thereof, and having its radially outer extremity terminating approximately beneath the radially outer extremity of the steering wheel, the other finger engaging portion extending radially outwardly with respect to the steering wheel beyond said first named finger engaging portion.

10. In combination with a vehicle steering wheel, a lever mounted beneath and approximately radially of the steering wheel and supported for movement whereby the end of the lever adjacent the rim of the steering wheel is movable toward and away from the steering wheel and is movable parallel to the plane thereof, means biasing said lever to move the outer end thereof downwardly away from the steering wheel, and a handle element carried by the outer end of said lever and arranged in such position with respect to the steering wheel as to permit access of the hand of the operator to said handle element without the operator having to remove his hand from the steering wheel, said handle element having a pair of finger engaging portions one of which is parallel to the plane of the steering wheel and is arranged beneath the rim thereof, the other finger engaging portion being arranged perpendicular to and extending radially outwardly beyond said first named portion.

11. In combination with a vehicle steering wheel and column, a member supported adjacent and parallel to the steering column for turning movement on its own axis, a second member mounted for axial movement with respect to the first named member, a lever arranged beneath the steering wheel and connected to said members whereby movement of the outer end of said lever parallel to the steering wheel turns said first named member and whereby movement of the outer end of said lever toward and away from the steering wheel effects axial movement of the second named member, and a handle element carried by the outer end of said lever and arranged in such position with respect to the steering wheel as to permit access of the hand of the operator to said handle element without the operator having to remove his hand from the steering wheel, said handle element comprising a pair of finger engaging portions approximately perpendicular to each other and respectively engageable to effect said two movements of said lever.

12. In combination with a vehicle steering wheel and column, a member supported adjacent and parallel to the steering column for turning movement on its own axis, a second member mounted for axial movement with respect to the first named member, a lever arranged beneath the steering wheel and connected to said members whereby movement of the outer end of said lever parallel to the steering wheel turns said first named member and whereby movement of the outer end of said lever toward and away from the steering wheel effects axial movement of the second named member, and a handle element carried by the outer end of said lever and arranged in such position with respect to the steering wheel as to permit access of the hand of the operator to said handle element without the operator having to remove his hand from the steering wheel, said handle element comprising a pair of finger engaging portions arranged approximately perpendicular to each other, one of such portions being arranged parallel to the plane of the steering wheel beneath the rim thereof.

13. In combination with a vehicle steering wheel and column, a member supported adjacent and parallel to the steering column for turning movement on its own axis, a second member mounted for axial movement with respect to the first named member, a lever arranged beneath the steering wheel and connected to said members whereby movement of the outer end of said lever parallel to the steering wheel turns said first named member and whereby movement of the outer end of said lever toward and away from the steering wheel effects axial movement of the second named member, and a handle element carried by the outer end of said lever and arranged in such position with respect to the steering wheel as to permit access of the hand of the operator to said handle element without the operator having to remove his hand from the steering wheel, said handle element comprising a pair of finger engaging portions arranged approximately perpendicular to each other, one of such portions being arranged parallel to the plane of the steering wheel beneath the rim thereof, the other finger engaging portion extending radially outwardly beyond the rim of the steering wheel.

14. In combination with a vehicle steering wheel and column, a member supported adjacent and parallel to the steering column for turning movement on its own axis, a second member mounted for axial movement with respect to the first named member, a lever arranged beneath the steering wheel and connected to said members whereby movement of the outer end of said lever parallel to the steering wheel turns said first named member and whereby movement of the outer end of said lever toward and away from the steering wheel effects axial movement of the second named member, spring means acting to bias the outer end of said lever downwardly away from the steering wheel, and a handle element carried by the outer end of said lever and arranged in such position with respect to the steering wheel as to permit access of the hand of the operator to said handle element without the operator having to remove his hand from the steering wheel, said handle element comprising a pair of finger engaging portions arranged approximately perpendicular to each other and one of which is arranged approximately parallel to the steering wheel beneath the rim thereof, the other finger engaging portion being arranged beneath the first named portion and extending radially outwardly therebeyond with respect to the steering wheel.

15. A manually operable lever unit comprising a lever, means adjacent one end of said lever for supporting it for turning movement in either of two planes, and a handle element carried by the other end of said lever, said handle element comprising a pair of finger engaging portions arranged substantially perpendicular to each other and each arranged substantially perpendicular to one of said planes of turning movement, one of said finger engaging portions extending a substantial distance beyond the other such portion away from the first named end of said lever.

16. A manually operable lever unit comprising a lever, means adjacent one end of said lever for supporting it for turning movement in either of two planes, and a handle element carried by the other end of said lever, said handle element comprising a pair of finger engaging portions arranged substantially perpendicular to each other and each arranged substantially perpendicular to one of said planes of turning movement, said finger engaging portions being formed integral with each other with one such portion extending from one face of the other portion approximately centrally of the width of the latter, said first mentioned portion extending a substantial distance beyond the other portion away from the first named end of said lever.

HENRY W. HEY.